United States Patent [19]

Matty et al.

[11] 4,015,082
[45] Mar. 29, 1977

[54] MULTI-CHANNEL SIGNAL DECODER

[75] Inventors: Thomas C. Matty, North Huntingdon; Arun P. Sahasrabudhe, Monrceville, both of Pa.

[73] Assignee: Westinghouse Electric Corporation, Pittsburgh, Pa.

[22] Filed: Mar. 13, 1975

[21] Appl. No.: 558,108

[52] U.S. Cl. ..................... 178/66 R; 340/171 PF
[51] Int. Cl.² ................................. H04L 27/14
[58] Field of Search .......... 325/55, 64; 179/15 FD, 179/15 BA; 178/66 R, 68; 340/147 F, 147 MD, 167 R, 167 B, 168 R, 168 B, 168 CC, 168 SC, 171 R, 171 A, 171 PF

[56] References Cited
UNITED STATES PATENTS 3,179,748  4/1965  Farrow ........................... 178/66 R
3,882,545  5/1975  Titus ............................... 340/171 A Primary Examiner—Benedict V. Safourek
Attorney, Agent, or Firm—R. G. Brodahl

[57] ABSTRACT

A signal decoder is disclosed for use in a transportation vehicle control system in which vehicle control signal information bits are transmitted according to a multiple message frequency, FM, PSK, or FSK, comma-free binary coded command signal. The disclosed invention uses selective receiver channels for each command signal message frequency to detect information bits according to the selected message frequency. The detected information bits of each receiver channel are separately stored to comprise a separate information history for each message frequency and these information bit histories are then individually decoded. The decoded signals are compared to detect a discrepancy between any of the decoded signals due to component failures, signalling system noise, or component transient conditions. For any discrepancy between the decoded signals, a fail-safe comparator reduces the decoded signal to a more safe condition.

17 Claims, 4 Drawing Figures

MULTI-CHANNEL SIGNAL DECODER

CROSS-REFERENCE TO RELATED APPLICATIONS

Reference is made to concurrently filed patent applications entitled "Quad State Receiver", Ser. No. 558,097, filed Mar. 13, 1975, on behalf of T. C. Matty and A. Sahasrabudhe; and "Fail-Safe Speed Command Signal Decoder", Ser. No. 568,226, filed Apr. 15, 1975, on behalf of A. Sahasrabudhe and M. McGinty. Each of these referenced patent applications is assigned to the assignee of the present invention.

BACKGROUND OF THE INVENTION

In a typical transit system operative with commafree, binary coded vehicle control signals, speed command information is transmitted on multiple message frequencies (e.g. $F_1$ and $F_2$) which typically represent binary logic conditions (e.g. 1 and 0). A digital frequency modulation method (FM), frequency shift key modulation method (FSK), or phase shift key modulation method (PSK) is employed to carry the binary coded, speed command information to the transit vehicles. Before the information transmitted by the message frequencies can be utilized, it must be decoded according to the particular modulation method used by the system. This decoding must be performed in a manner such that extraneous signals will not cause the vehicle to operate in an unsafe manner.

In attempting to achieve this safety requirement, vehicle command signal decoders of the prior art used a limiting amplifier to establish a "capture effect", by which a coded message signal of large amplitude could screen out extraneous signals of lower amplitude. The gain of the limiting amplifier was high enough so that any input signal of a predetermined minimum value would result in a limited maximum output of the same polarity. Therefore, as long as the amplitude of the message signal was large enough to maintain the minimum value of the input signal while, at the same time, offsetting any other input signals, the polarity of the limited output of the limiting amplifier was determined by the polarity of the message signal. For example, an input message signal whose amplitude was at least twice as large as the amplitude of any other input signal, i.e., noise or transient filter responses, would screen out the other signals so that the polarity of the limited maximum output of the limiting amplifier would be determined by the polarity of the message input signal.

A problem with the prior art decoders was caused by the high gain of the limiting amplifier. For example, if the output of a filter in the prior art decoder were to contain a transient response while the message frequency being transmitted was outside the bandwidth of the filter, the limiting amplifier could recognize this transient response as a valid input and amplify it to the limited level so that the decoder would decode inaccurate information.

The high gain of the limiting amplifier could also cause errors in detection where the large amplitude message signal was lost. When the large amplitude message signal was not present to screen out the smaller, extraneous signals, the limiting amplifier could amplify these extraneous signals also causing the decoder to decode inaccurate information.

Also, the failure of a filter could allow a signal outside the bandwidth of the filter to reach the input of the limiting amplifier where it could be amplified and again cause the decoder to decode inaccurate information.

It was the purpose of the present invention to provide a transit vehicle signal decoder that could improve transit system safety by eliminating the decoding errors caused by the use of limiting amplifiers.

SUMMARY OF THE INVENTION

There is provided a decoder for decoding, in a fail-safe manner, information from a signal containing two or more message frequencies. Any signal of a frequency substantially equal to a message frequency is isolated from all other signals delivered to the receiver. The presence of each isolated signal is then separately detected in relation to its respective message frequency. The history of each isolated, detected message frequency is separately recorded and this recorded history separately decoded to provide information decoded according to a single message frequency. Detected signals of different message frequencies are decoded in a complementary fashion. The information determined according to all message frequencies is then compared in a fail-safe manner. If the information decoded from all the message frequencies is identical it is presumed that the information has been accurately decoded and is safe to use. If the information if not identical, the transmitted signal has been inaccurately decoded, and, since the information is unsafe for use, no output is provided.

PREFERRED EMBODIMENT OF THE INVENTION

The preferred embodiment of the invention discloses a method for decoding a comma-free, binary coded, speed command signal on board a transit system vehicle. This preferred embodiment provides a more accurate, safer, decoder than vehicle speed command decoders of the prior art.

Figure 1:
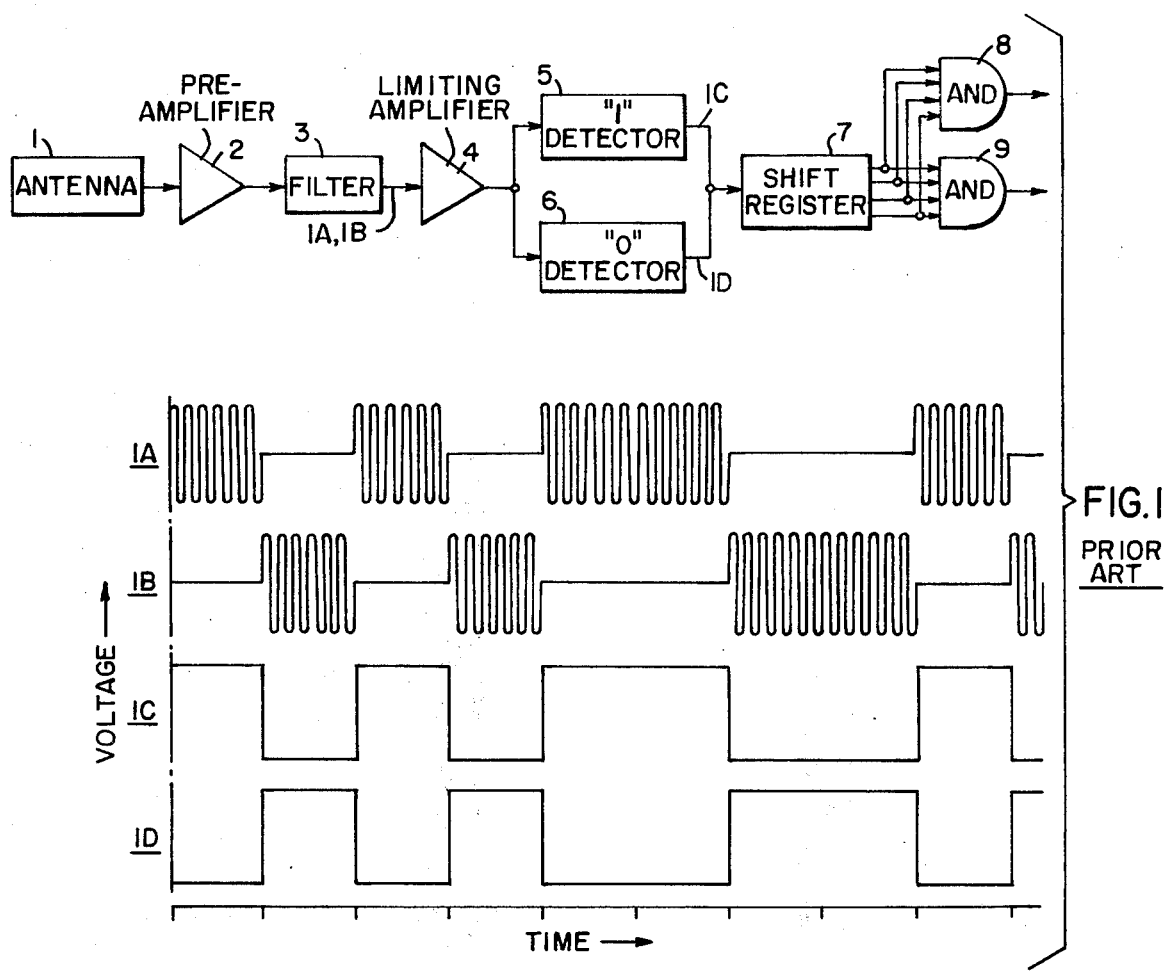
FIG. 1 is a block diagram of a vehicle command signal decoder of the prior art with examples of waveforms contained therein.

FIG. 1 illustrates a typical vehicle speed command signal decoder of the prior art. An antenna 1 receives a coded, binary speed command signal comprising frequencies $F_1$ and $F_2$ which represent logic conditions 1 and 0 respectively. This command signal is passed to a preamplifier 2, and then to a band-pass filter 3. The bandwidth of the filter 3 includes both the 1 and 0 message frequencies. An example of a typical output of filter 3 is shown in curves 1A and 1B of FIG. 1. The output of the filter is delivered to a limiting amplifier 4. The filtered frequencies are amplified to a limited amount by the limiting amplifier 4, after which a first detector 5 detects the presence of the 1 frequency and a second detector 6 detects the presence of the 0 frequency. The outputs of detectors 5 and 6 (curves 1C and 1D for the exemplary signals of curves 1A and 1B, respectively) are sent to a shift register 7. Vehicle command information is decoded from the contents of shift register 7 through multiple AND gates 8 and 9.

Figure 2:
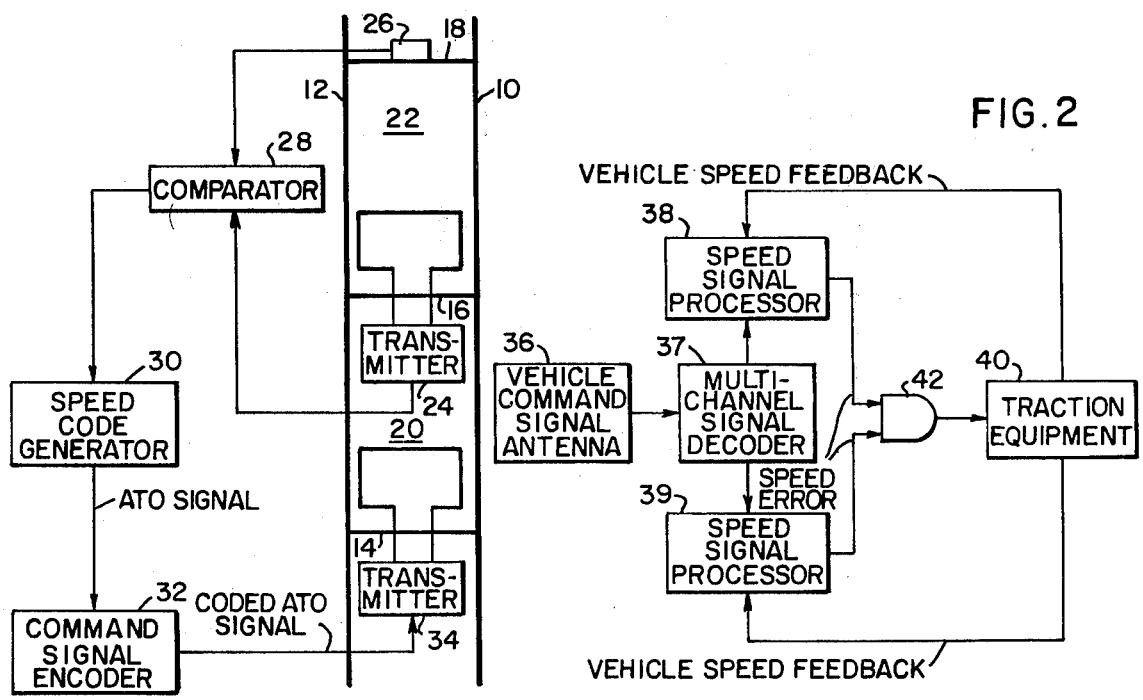
FIG. 2 is a block diagram of a transit vehicle control system in which the present invention could be used.

FIG. 2 is a block diagram representation of a vehicle control system in which the disclosed multi-channel signal decoder may be utilized. The vehicle pathway consists of metal rails 10 and 12 which will accommodate the wheels of the vehicle (not shown). Metal rails 10 and 12 are connected by shorting bars 14, 16 and 18 which divide the pathway into signal blocks 20 and 22. A first transmitter 24, located at shorting bar 16, transmits a signal through metal rails 10 and 12 of signal block 22 to a signal receiver 26 located at shorting bar 18. At the same time, the signal of transmitter 24 is sent to comparator 28, where it is compared with the signal received by receiver 26. By using the relative strengths of the transmitted and received signals, the comparator 28 can detect the presence of a vehicle in a signal block 22. The comparator 28 signals a speed code generator 30, to which it is connected as to whether a vehicle is present in signal block 22. The speed code generator 30 uses this signal, along with other inputs, to determine the value of the automatic train operation (ATO) signal. The ATO signal is then delivered to a command signal encoder 32 where the ATO signal is coded in accordance with a predetermined signaling method (e.g., FM, FS, or PSK). The coded ATO signal is then conveyed to a second transmitter 34 which transmits it through the rails of signal block 20. The system thus far described is well known and is explained in U.S. Pat. Nos. 3,794,977 and 3,821,544.

When a vehicle is present in signal block 20, the coded ATO signal, traveling through the rails 10 and 12 of signal block 20 is received through vehicle antenna 36. This signal is sent to the multi-channel signal decoder 37 which is the preferred embodiment of the present invention. As explained later, the multi-channel signal decoder decodes, in a fail-safe manner, the coded ATO signal to produce the command signal which was generated by speed code generator 30.

The decoded ATO command signal is provided to signal processors 38 and 39 which are described in U.S. Pat. No. 3,749,994. The speed signal processors independently compare the denoted ATO signal with a speed feedback signal from the traction equipment 40 to provide separate speed error signals to fail-safe AND gate 42. Fail-safe AND gate 42 is described in U.S. Pat. No. 3,673,429 and the traction equipment, which propels the vehicle may be comprised of a chopper type motor control (or equivalent apparatus), motors, gears, axles, and wheels. If the speed error signals provided to fail-safe AND gate 42 are substantially identical, the fail-safe AND gate passes this signal to the traction equipment. As explained in U.S. Pat. No. 3,673,429, if the speed error signals are not identical, no speed command signal is provided to the traction equipment which is deemed a fail-safe condition for the system.

Figure 3:
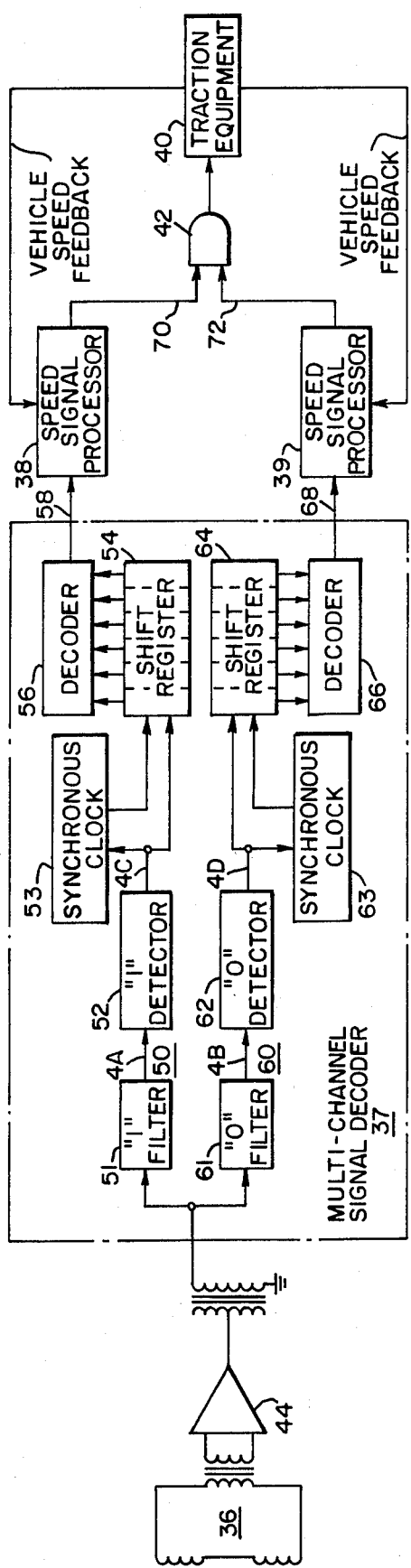
FIG. 3 is a block diagram of the preferred embodiment of the multi-channel signal decoder of the present invention.

FIG. 3 is a block diagram of the disclosed multi-channel signal decoder 37. This preferred embodiment operates on a PSK, comma-free, binary coded message comprised of 1 and 0 message units in which the 1's are transmitted at a first frequency and the 0's are transmitted at a second frequency. (Alternatively, the message could be FSK or FM modulated and derived from either the 1's or the 0's alone.)

Figure 4:
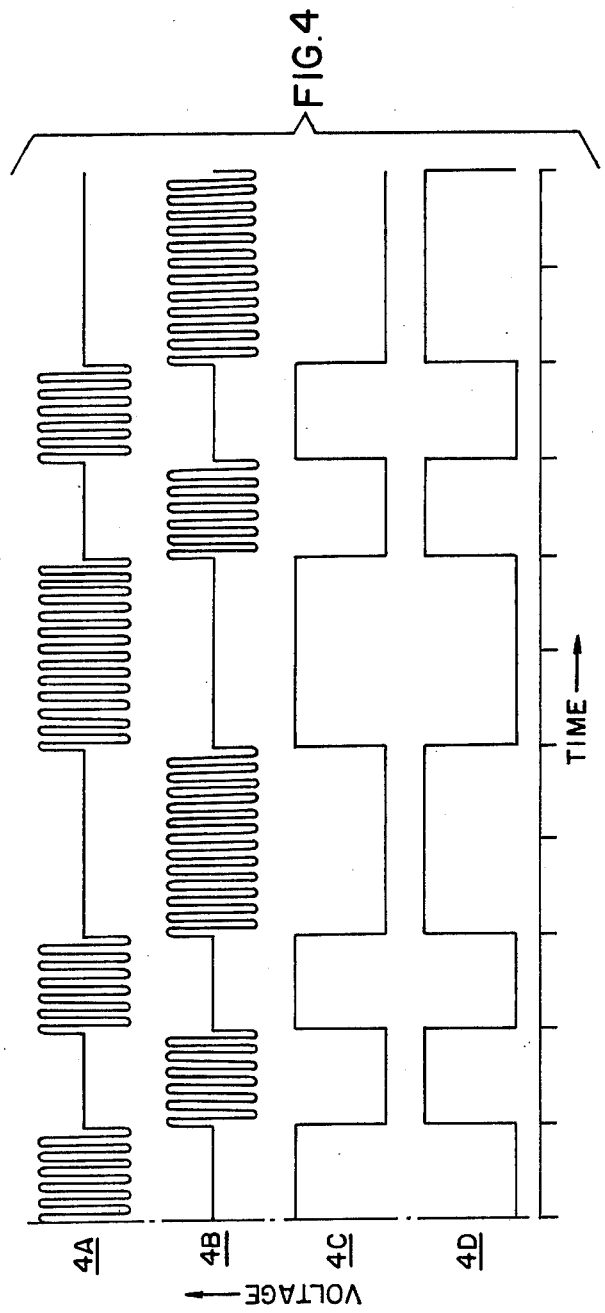
FIG. 4 represents the waveform of signals at various points in FIG. 3.

In the preferred embodiment, the vehicle senses the coded speed command signal through an on-board antenna 36 which is transformer coupled to preamplifier 44. Preamplifier 44 is transformer coupled to signal channels 50 and 60 which comprise the disclosed multi-channel decoder. Signal channel 50 includes band-pass filter 51, threshold detector 52, synchronous clock 53, a storing means which, for example, may be comprised of shift register 54, and decoder 56. Band-pass filter 51 is tuned to the 1 frequency and threshold detector 52 detects the presence of the 1 frequency. Assuming that the coded ATO speed command signal being received is 10100110100, curve 4A of FIG. 4 shows the corresponding output of filter 51, and curve 4C of FIG. 4 shows the correlative output of detector 52. The outputs of filter 51 and detector 52 would, of course, depend upon the coded ATO signal that was being transmitted and would vary with that signal. Synchronous clock 53 provides a clock pulse rate equal to the rate of input of command signal message units. For example, if the ATO signal message rate is 18 units per second, there will be 18 clock pulses per second. Clock 53 is synchronized with threshold detector 52. The 1 and 0 message units as detected from the 1 frequency by the threshold detector 52 according to the presence or absence of the 1 frequency respectively, are applied to the input of 6 bit shift register 54 and are sequentially shifted through shift register 54 in response to the clock pulses from clock 53. After each pulse from clock 53, a decoder 56, which may be comprised of a read only memory, decodes the message present in the register 54, and provides a decoded ATO speed command on line 58.

Channel 60 includes band-pass filter 61 threshold detector 62, synchronous clock 63, a storing means which, for example, may be comprised of shift register 64, and decoder 66. Band-pass filter 61 is tuned to the 0 frequency and threshold detector 62 detects the presence of the 0 frequency. For the same coded ATO command signal as for curves 4A and 4C of FIG. 4, curve 4B shows the output of filter 61 and curve 4D shows the correlative output of threshold detector 62. Synchronous clock 63 provides clock pulse outputs at the same rate as the input of command signal message units in the same manner as synchronous clock 53. Clock 63 is synchronized with detector 62. The 0 and 1 message units detected from the 0 frequency by the threshold detector 62 according to the presence or absence of the 0 frequency respectively, which message units are complementary to the message units detected from the 1 frequency by the threshold detector 52 (curves 4C and 4D), are applied to shift register 64, and are sequentially shifted through shift register 64 in response to the clock pulses from clock 63. After each pulse from clock 63, a decoder 66, whose logic is complementary to the logic of decoder 56, decodes the message units present in register 64 and provides a decoded ATO speed command on line 68.

If there have been no decoding errors in channel 50 or channel 60, the decoded ATO speed command on line 58 will be identical to the decoded ATO speed command on line 68 (assuming complementary decoding errors did not occur in both decoding channels 50 and 60).

Lines 58 and 68 individually connect with redundant signal processors 38 and 39, respectively, where the decoded speed command signals are compared with a vehicle speed feedback signal and speed error signals 70 and 72 are independently derived. The error signal 70 is then compared with error signal 72 in fail-safe AND gate 42. If error signals 70 and 72 are substantially identical, the error signal is used to excite the vehicle traction equipment 40. If error signals 70 and 72 are not substantially identical, a zero speed signal is provided to the traction equipment. This zero speed condition is deemed to be a fail-safe condition for the vehicles in the transportation system.

Since the multi-channel decoder signal on line 58 must correspond with the multi-channel decoder signal on line 68 before error signal 70 will correspond with error signal 72, and since error signal 70 must correspond with error signal 72 before the traction equipment can be excited, the decoder signal on line 58 must correspond with the decoder signal on line 68 before the traction equipment can be excited. Therefore, the disclosed multi-channel decoder will cause the vehicle traction equipment to respond in a safe manner whenever decoder signals on lines 58 and 68 do not correspond due to an error in decoding the coded ATO speed signal. That is, the disclosed multi-channel decoder creates a fail-safe condition by producing non-corresponding decoder signals on lines 58 and 68.

Basically, there are three causes of errors in decoding a detected signal. First, there could be one or more component failures in the hardware of the multi-channel signal decoder. Second, the transient response of a filter could cause that filter's associated detector to detect an erroneous message unit which would be stored in the shift register and subsequently decoded by the decoder. Third, the vehicle antenna could receive a constant frequency (noise) signal which was extraneous to the coded ATO signal and was also within the bandwidth of one of the filters thereby causing the channel containing that filter to respond to that extraneous signal. Decoding errors arising from one or more of these causes will result in non-correspondence between speed signals 58 and 68 thereby making the disclosed multi-channel decoder signal fail-safe for any decoding error except for complementary errors that occur simultaneously in both decoding channels. The possibility that complementary errors will occur simultaneously in both decoding channels is deemed so remote that it does not merit protection.

We claim:
1. In apparatus for providing an output control signal by decoding control information messages from a message signal containing multiple message frequencies, the apparatus comprising:
  means for filtering first and second message frequencies from said message signal;
  means for detecting first and second information messages from the respective first and second message frequencies, with one filtering means being operative with one detecting means in relation to each of said first and second message frequencies;
  means for storing said first and second information messages;
  means for decoding said first and second information messages; and
  means for comparing said decoded first and second information messages to provide said output control signal when said first information message has a predetermined relationship with said second information message.

2. The apparatus of claim 1 with one detecting means being operative with one storing means in relation to each of said first and second message frequencies.

3. The apparatus of claim 2 with one decoding means being operative with one storing means in relation to each of said first and second message frequencies.

4. In apparatus for providing an output control signal by decoding an information signal containing multiple message frequencies, the apparatus comprising:
  means for filtering first and second message frequencies from said message signal;
  means for decoding each of said first and econd message frequencies, with one filtering means being operative with one decoding means in relation to each of said first and second message frequencies; and
  means for comparing said decoded first and second message frequencies for providing said output control signal when said first and second message frequencies have a predetermined relationship.

5. The apparatus of claim 4 with said decoding means being comprised of read only memories.

6. Apparatus for decoding information stored as a plurality of message frequencies which comprise a message signal, said apparatus comprising:
  first filter means for filtering a first message frequency from said message signal;
  second filter means for filtering a second message frequency from said message signal where said second message frequency is complementary to said first message frequency;
  first detector means for detecting first message units in exclusive response to said first message frequency filtered by said first filter means;
  second detector means for detecting second message units in exclusive response to said second message frequency filtered by said second filter means, where said second message units are complementary to said first message units of said first detector means;
  first storage means for storing said first message units of said first detector means;
  second storage means for storing said second message units of said second detector means;
  means for decoding a first command signal in relation to said first message units stored in said first storage means;
  means for decoding a second command signal in complementary relation to said second message units stored in said second storage means; and
  means for comparing said first command signal with said second command signal for providing an output signal when said first command signal has a predetermined relationship to said second command signal.

7. The apparatus of claim 6 including:
  means for providing clock pulses to said first storage means in relation to said first message units of said first detector means for sequentially shifting said first message units through said first storage means; and
  means for providing clock pulses to said second storage means in relation to said second message units of said second detector means for sequentially shifting said second message units through said second storage means.

8. In a vehicle control system, apparatus for providing, in relation to a plurality of message frequencies which comprise a message signal, a speed error signal to vehicle traction equipment having first and second feedback signals, said apparatus comprising:
  first filter means for filtering a first message frequency from said message signal;

second filter means for filtering a second message frequency from said message signal, where said second message frequency is complementary to said first message frequency;

first detector means for detecting first message units in response to said first message frequency filtered by said first filter means;

second detector means for detecting second message units in exclusive response to said second message frequency filtered by said second filter means, where said second message units are complementary to said first message units of said first detector means;

first storage means for storing said first message units of said first detector means;

second storage means for storing said second message units of said second detector means;

first decoder means for decoding a first command signal in relation to said first message units stored in said first storage means;

second decoder means for decoding a second command signal in complementary relation to said second message units stored in said second storage means; and means for providing said speed error signal to said traction equipment in relation to a predetermined comparison between said first and second command signals.

9. The apparatus of claim 8 including:

means for providing clock pulses to said first storage means in relation to said first message units of said first detector means for sequentially shifting said first message units through said first storage means; and means for providing clock pulses to said second storage means in relation to said message units of said second detector means for sequentially shifting said second message units through said second storage means.

10. The apparatus of claim 8 in which each of said first and second decoder means includes a read only memories.

11. The apparatus of claim 8 in which said first and second storage means are comprised of shift registers.

12. The apparatus of claim 8 in which said speed error signal providing means comprises:

a first signal processor which provides a first error signal in relation to said first decoder means and in relation to said first feedback signal provided by said traction equipment; and a second signal processor which provides a second error signal in relation to said second decoder means and in relation to said second decoder means and in relation to said second feedback signal provided by said traction equipment; and signal comparison means for providing said speed error signal to said traction equipment when said first error signal is substantially identical to said second error signal.

13. In a vehicle control system apparatus for providing, in relation to a plurality of message frequencies which comprise a message signal, a speed error signal to vehicle traction equipment having first and second feedback signals, said apparatus comprising:

first filter means for filtering a first message frequency from said message signal;

second filter means for filtering a second message frequency from said message signal, where said second message frequency is complementary to said first message frequency;

first detector means for detecting first message units in exclusive response to said first message frequency filtered by said first filter means;

second detector means for detecting second message units in exclusive response to said second message frequency filtered by said second filter means, where said second message units are complementary to said first message units of said first detector means;

first storage means for storing said first message units of said first detector means;

second storage means for storing said second message units of said second detector means;

first decoder means for decoding a first command signal in relation to said first message units stored in said first storage means;

second decoder means for decoding a second command signal in complementary relation to said second message units stored in said second storage means; and means for providing said speed error signal to said traction equipment in relation to a predetermined comparison of said first and second command signals with said first and second feedback signals of said traction equipment.

14. The apparatus of claim 13 including:

means for providing clock pulses to said first storage means in relation to said first message units of said first detector means for sequentially shifting said first message units through said first storage means; and means for providing clock pulses to said second storage means in relation to said second message units of said second detector means for sequentially shifting said second message units through said second storage means.

15. The apparatus of claim 13 in which each of said first and second decoder means includes a read only memory.

16. The apparatus of claim 13 in which said first and second storage means comprise shift registers.

17. The apparatus of claim 13 in which said speed error signal providing means comprises:

a first signal processor which provides a first error signal in relation to said first decoder means in relation to said first feedback signal provided by said traction equipment;

a second signal processor which provides a second error signal in relation to said second decoder means and in relation to said second feedback signal provided by said traction equipment; and signal comparison means for providing said speed error signal to said traction equipment when said first error signal is substantially the same as said second error signal.

* * * * *